(12) United States Patent
Uchida

(10) Patent No.: US 9,037,055 B2
(45) Date of Patent: May 19, 2015

(54) ROTATING BODY SUPPORT DEVICE AND FIXING DEVICE HAVING ROTATING BODY SUPPORT DEVICE, AND IMAGE FORMING APPARATUS

(71) Applicant: KYOCERA Document Solutions Inc., Osaka-shi, Osaka (JP)

(72) Inventor: Kosuke Uchida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/011,779

(22) Filed: Aug. 28, 2013

(65) Prior Publication Data

US 2014/0064802 A1    Mar. 6, 2014

(30) Foreign Application Priority Data

Aug. 31, 2012   (JP) .................................. 2012-191371

(51) Int. Cl.
| | | |
|---|---|---|
| G03G 15/20 | (2006.01) | |
| G03G 21/16 | (2006.01) | |
| F16C 35/073 | (2006.01) | |
| G03G 15/09 | (2006.01) | |

(52) U.S. Cl.
CPC .......... *G03G 21/1685* (2013.01); *F16C 35/073* (2013.01); *G03G 15/0935* (2013.01)

(58) Field of Classification Search
USPC ......... 384/495, 535, 537, 543, 546, 558, 581, 384/584, 585, 587; 399/328–331
See application file for complete search history.

(56) References Cited

U.S. PATENT DOCUMENTS

| 4,549,823 | A | * | 10/1985 | Nichting | .................. | 384/537 |
| 4,697,937 | A | * | 10/1987 | Karlsson et al. | .............. | 384/486 |
| 5,722,025 | A | * | 2/1998 | Morigami et al. | ............ | 399/330 |
| 2011/0033146 | A1 | * | 2/2011 | Shiraki | .................. | 384/513 |

FOREIGN PATENT DOCUMENTS

| JP | 4-337116 | 11/1992 |
| JP | 2007-161082 | 6/2007 |

(Continued)

OTHER PUBLICATIONS

Japanese Office Action—Aug. 12, 2014.

(Continued)

*Primary Examiner* — Rodney Bonnette
(74) *Attorney, Agent, or Firm* — Gerald E. Hespos; Michael J. Porco; Matthew T. Hespos

(57) ABSTRACT

A rotating body support device includes a shaft, a bearing, a mounting member, and a protruding part. The shaft serves as a rotating shaft which rotates or a fixed shaft during rotation of a rotating body. The bearing includes an inner peripheral part for supporting the shaft and an outer peripheral part disposed at an interval in a radial direction relative to the inner peripheral part. The mounting member includes an insertion part on which the outer peripheral part is mounted, and supports the bearing. The protruding part is provided to protrude from one of a peripheral face of the shaft and the inner peripheral part of the bearing in the radial direction along a peripheral direction of the rotation. Moreover, the protruding part comes into contact, along the peripheral direction, with the other one of the peripheral face of the shaft and the inner peripheral part of the bearing.

13 Claims, 8 Drawing Sheets

(56) References Cited

FOREIGN PATENT DOCUMENTS

| | | |
|---|---|---|
| JP | 2009-243560 | 10/2009 |
| JP | 2010-133467 | 6/2010 |

OTHER PUBLICATIONS

Japanese Patent Appl. No. 2012-191371—Office Action issued Dec. 9, 2014.

* cited by examiner

US 9,037,055 B2

ROTATING BODY SUPPORT DEVICE AND FIXING DEVICE HAVING ROTATING BODY SUPPORT DEVICE, AND IMAGE FORMING APPARATUS

This application relates to and claims priority from Japanese Patent Application No. 2012-191371, filed on Aug. 31, 2012, the entire disclosure of which is incorporated herein by reference.

BACKGROUND

The present disclosure relates to a rotating body support device for supporting a rotating body and to a fixing device having the rotating body support device, and an image forming apparatus.

Conventionally, a rotating body support device for rotatably supporting a rotating body includes a rotating body, a bracket, and a bearing. The bearing is mounted on an insertion part formed on the bracket. Moreover, the rotating body includes a shaft, and the shaft is inserted rotatably into an inner peripheral part of the bearing. Depending on the usage environment, there are cases where the rotating body support device is subject to a load in a direction which intersects with the axial direction of the rotating body relative to the bracket. As such usage environment, there is a fixing device which performs fixation treatment of a toner image to a sheet in an image forming apparatus in which an image is formed on a sheet. The rotating body support device supports a fixing roller of the fixing device. When the pressure roller, which forms a fixation nip part with the fixing roller, is pressed against the fixing roller, load is applied to the fixing roller and an outer peripheral part of the bearing is tilted. Meanwhile, since the inner peripheral part of the bearing is supporting the rotating shaft of the fixing roller, it is tilted at an angle that is different from that of the outer peripheral part. With this kind of fixing device, there were cases where the bearing would become damaged as a result of the difference in the tilt angle between the outer peripheral part and the inner peripheral part of the bearing becoming significant.

The present disclosure was devised in order to resolve the foregoing problem, and an object of the present disclosure is to inhibit the bearing, which rotatably supports the rotating body, from becoming damaged.

SUMMARY

The rotating body support device according to one aspect of the present disclosure includes a shaft, a bearing, a mounting member, and a protruding part. The shaft serves as a rotating shaft which rotates or a fixed shaft during rotation of a rotating body. The bearing includes an inner peripheral part for supporting the shaft and an outer peripheral part disposed at an interval in a radial direction relative to the inner peripheral part. The mounting member includes an insertion part, on which the outer peripheral part is mounted, and supports the bearing. The protruding part is provided to protrude from one of a peripheral face of the shaft and the inner peripheral part of the bearing in the radial direction along a peripheral direction of the rotation. Moreover, the protruding part comes into contact, along the peripheral direction, with the other one of the peripheral face of the shaft and the inner peripheral part of the bearing.

Moreover, the fixing device according to another aspect of the present disclosure includes a fixing roller, a pressure roller, and the rotating body support device. The fixing roller is placed opposite to a developer image carried on a sheet. The pressure roller is pressed against the fixing roller and forms a fixation nip part with the fixing roller through which the sheet passes. The rotating body support device rotatably supports the fixing roller or the pressure roller as the mounting member.

Moreover, the image forming apparatus according to another aspect of the present disclosure includes an image forming part, and the fixing device. The image forming part forms an image of a sheet.

DETAILED DESCRIPTION

Figure 1:
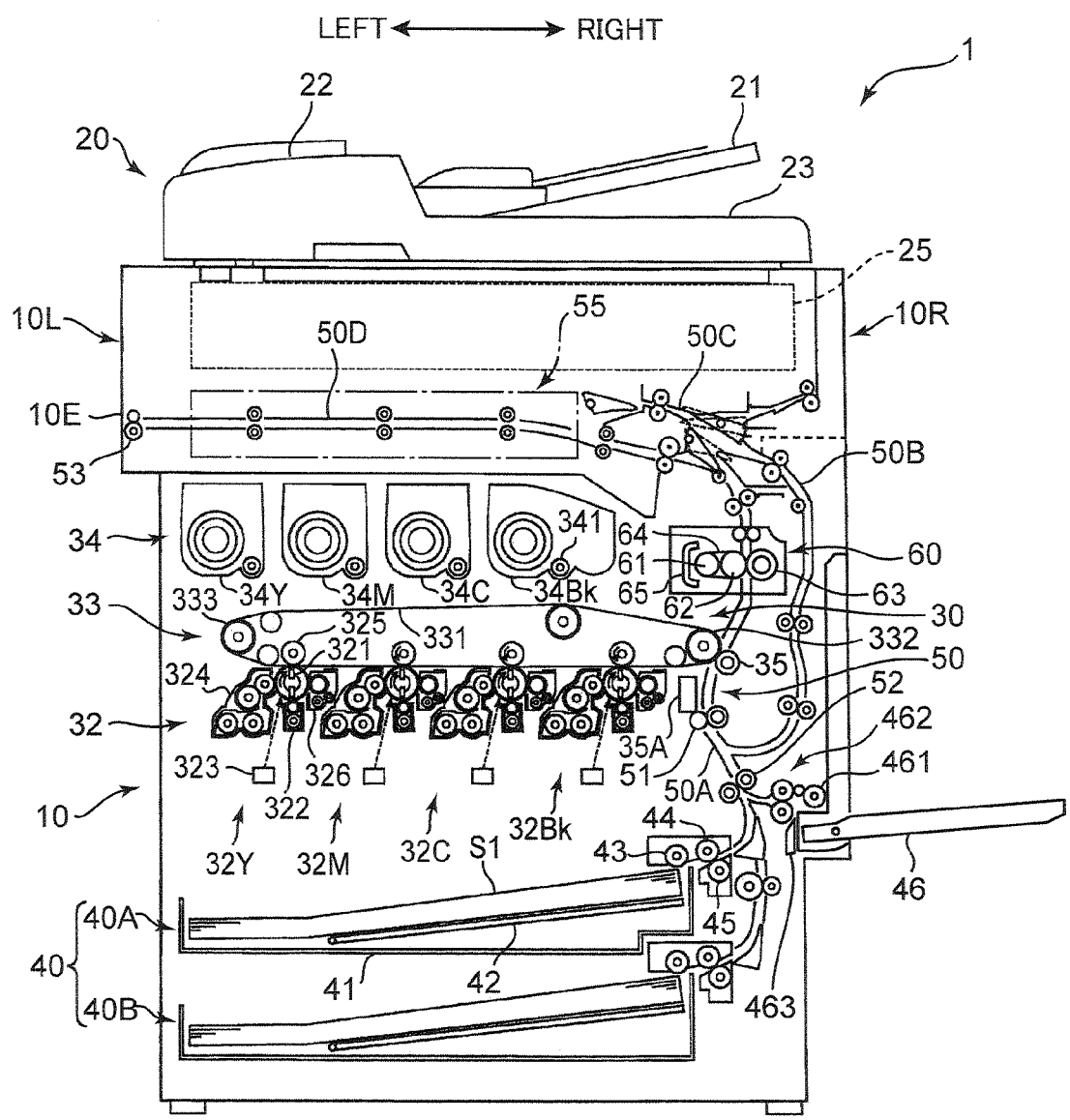
FIG. 1 is a cross section showing the internal structure of the image forming apparatus according to an embodiment of the present disclosure.
Figure 2:
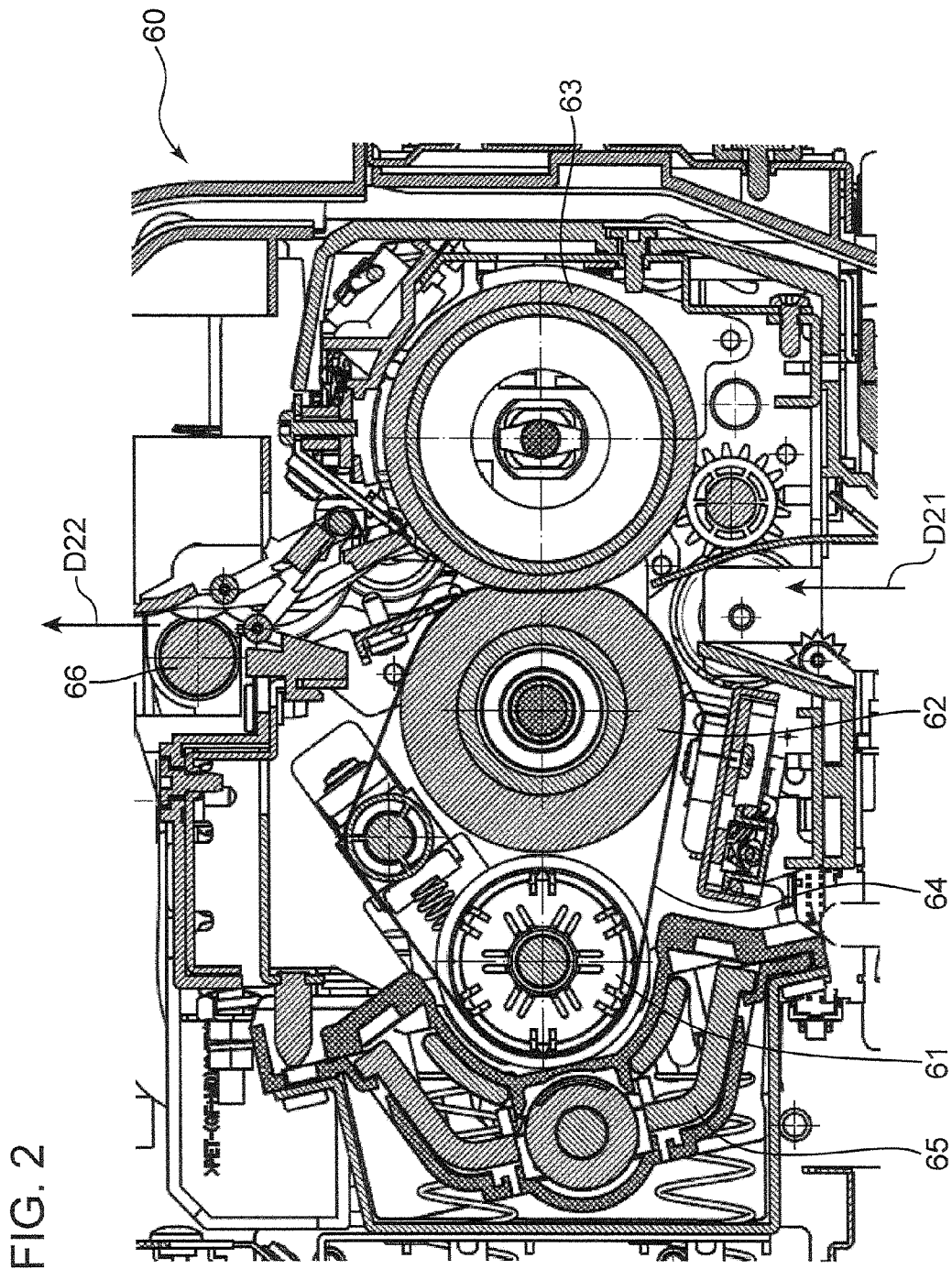
FIG. 2 is a cross section of the fixing device according to an embodiment of the present disclosure.

An embodiment of the present disclosure is now explained in detail with reference to the appended drawings. FIG. 1 is a cross section showing the internal structure of the image forming apparatus 1 according to an embodiment of the present disclosure. Here, while a multi-function apparatus including a printer function and a copying function is illustrated as the image forming apparatus 1, the image forming apparatus may also be a printer, a copier, or a facsimile device. Moreover, FIG. 2 is a cross section of the fixing unit 60 according to an embodiment of the present disclosure.

<Explanation of Image Forming Apparatus>

The image forming apparatus 1 includes an apparatus body 10 including a substantially rectangular housing structure, and an automatic document feeder 20 disposed on the apparatus body 10. The apparatus body 10 internally houses a reading unit 25 for optically reading a document image to be copied, an image forming part 30 for forming a toner image on a sheet, a fixing unit 60 for fixing the toner image on the sheet, a paper feeding unit 40 for storing the sheets to be transported to the image forming part 30, and a transport path 50 for transporting the sheets from the paper feeding unit 40 or the paper feeding tray 46 to a sheet discharge outlet 10E via the image forming part 30 and the fixing unit 60.

The automatic document feeder (ADF) 20 is turnably mounted on the upper face of the apparatus body 10. The ADF 20 includes a document tray 21 on which the document sheets are loaded, a document transport part 22 for transporting the document sheets via an automatic document reading position, and a document discharge tray 23 to which the read document sheets are discharged.

The reading unit 25 optically reads the image of the document sheet that is automatically fed from the ADF 20 or the document sheet that is manually placed on the upper face of the apparatus body 10.

The image forming part 30 performs processing of generating a full-color toner image, and transferring the generated toner image onto a sheet. The image forming part 30 includes an image forming unit 32, an intermediate transfer unit 33 disposed on and adjacent to the image forming unit 32, and a toner supplying part 34 disposed on the intermediate transfer unit 33. The image forming unit 32 includes four units 32Y, 32M, 32C, 32Bk for forming the respective toner images of yellow (Y), magenta (M), cyan (C) and black (Bk) disposed in tandem.

The respective image forming units 32Y, 32M, 32C, 32Bk includes a photoreceptor drum 321, and a charger 322, an exposure unit 323, a developing device 324, a primary transfer roller 325 and a cleaning device 326 disposed around the photoreceptor drum 321.

The photoreceptor drum 321 rotates about its axis, and an electrostatic latent image and a toner image are formed on the peripheral face thereof. The charger 322 uniformly charges the surface of the photoreceptor drum 321. The exposure unit 323 includes a laser light source and optical equipment such as a mirror and a lens.

The developing device 324 develops the electrostatic latent image formed on the photoreceptor drum 321. The developing device 324 uses a two-component developer, and includes a screw feeder, a magnetic roller, and a development roller.

The primary transfer roller 325 forms a primary transfer nip part with the photoreceptor drum 321 across the intermediate transfer belt 331 provided to the intermediate transfer unit 33, and performs the primary transfer of the toner image on the photoreceptor drum 321 onto the intermediate transfer belt 331. The cleaning device 326 includes a cleaning roller and the like, and cleans the peripheral face of the photoreceptor drum 321 after the transfer of the toner image.

The intermediate transfer unit 33 includes an intermediate transfer belt 331, a belt drive roller 332 and a driven roller 333. A toner image is overlappingly transferred, to one location, from a plurality of photoreceptor drums 321 onto the outer peripheral face of the intermediate transfer belt 331. The intermediate transfer unit 33 is rotated in the counterclockwise direction in FIG. 1.

The secondary transfer roller 35 is placed opposite to the peripheral face of the belt drive roller 332. A secondary transfer nip part between the belt drive roller 332 and the secondary transfer roller 35 becomes a secondary transfer unit for transferring, onto a sheet, the full-color toner image that was overlappingly applied to the intermediate transfer belt 331. Moreover, a concentration sensor 35A is placed opposite to the peripheral face of the intermediate transfer belt 331 at a position that is more on the upstream side in the rotating direction of the intermediate transfer belt 331 than the belt drive roller 332.

The toner supplying part 34 includes a yellow toner container 34Y, a magenta toner container 34M, a cyan toner container 34C, and a black toner container 34Bk.

The paper feeding unit 40 includes two-level paper feed cassettes 40A, 40B which house the sheets S to be subject to the image forming processing.

The paper feed cassette 40A (40B) includes a sheet housing part 41 for housing a sheet bundle configured as a result of the sheets S being stacked, and a lift plate 42 for lifting the sheet bundle for paper-feeding. The upper part on the right end side of the paper feed cassette 40A (40B) is provided with a pickup roller 43, and a roller pair configured from a paper feed roller 44 and a retard roller 45. As a result of the pickup roller 43 and the paper feed roller 44 being driven, the sheet S of the uppermost layer of the sheet bundle in the paper feed cassette 40A is fed one sheet at a time, and loaded to the upstream end of the transport path 50.

The transport path 50 includes a main transport path 50A for transporting the sheets S from the paper feeding unit 40 to the outlet of the fixing unit 60 via the image forming part 30, a reverse transport path 50B for returning a sheet, which was printed on one side, to the image forming part 30 in the case of performing duplex printing to the sheets S, and an upper transport path 50C and a lower transport path 50D for causing the sheets S to head toward the sheet discharge outlet 10E from the downstream end of the main transport path 50A.

A registration roller pair 51 is disposed on the side of the main transport path 50A that is more upstream than the secondary transfer unit. The sheets S are once stopped at the registration roller pair 51 in a stopped state and subject to skew correction. Subsequently, the sheets S are fed to the secondary transfer roller 35 as a result of the registration roller pair 51 being driven by a drive motor (not shown) at a predetermined timing for the image transfer. In addition, the main transport path 50A is provided with a plurality of sheet transport rollers 52 for transporting the sheets S. The other transport paths 50B, 50C, 50D are configured in the same manner.

The fixing unit 60 is an induction heating-type fixing device for performing fixation treatment of fixing the toner image on the sheet S, and includes a heating roller 61, a fixing roller 62, a pressure roller 63, a fixing belt 64, and an induction heating unit 65. The pressure roller 63 is pressed against the fixing roller 62 across the fixing belt 64, and a fixation nip part is thereby formed. The pressure roller 63 is rotatably driven by a driving means not shown. Meanwhile, the fixing roller 62 is drivenly rotated by the pressure roller 63. The fixing belt 64 is placed across between the fixing roller 62 and the heating roller 61. The fixing belt 64 is subject to induction heating by the induction heating unit 65 on the peripheral face of the heating roller 61, and applies the generated heat to the fixation nip part. As a result of the sheet S passing through the fixation nip part, the toner image that was transferred onto the sheet S becomes fixed to the sheet.

Referring to FIG. 2, in this embodiment, the sheet is loaded into the fixing unit 60 from below in the upward direction (arrow D21 of FIG. 2). Here, the face of the sheet onto which the toner image was formed comes into contact with the fixing belt 64 on the fixing roller 62. Moreover, the face on the side that is opposite to the face onto which the toner image was formed comes into contact with the pressure roller 63. The sheet that was subject to fixation treatment at the fixation nip part is further transported upward by the fixation/discharge roller 66 (arrow D22 of FIG. 2).

Figure 3:
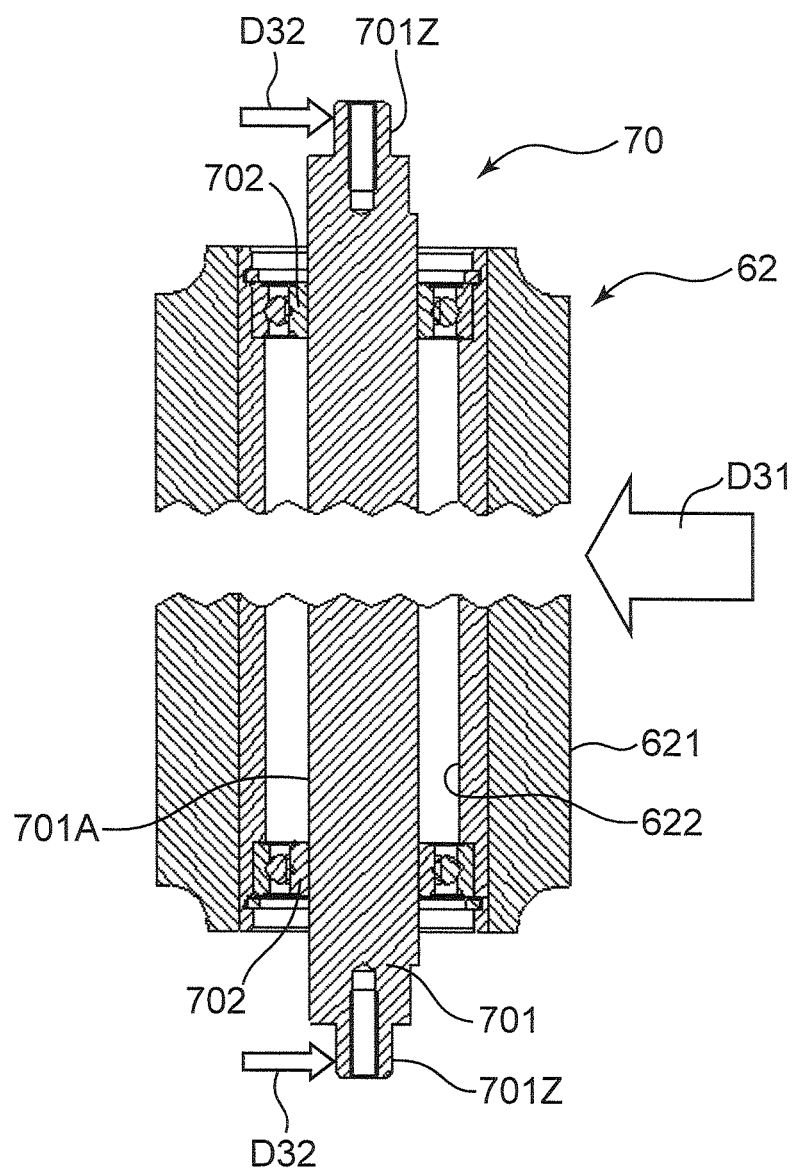
FIG. 3 is a cross section explaining the load that is applied to the fixing roller according to an embodiment of the present disclosure.
Figure 4:
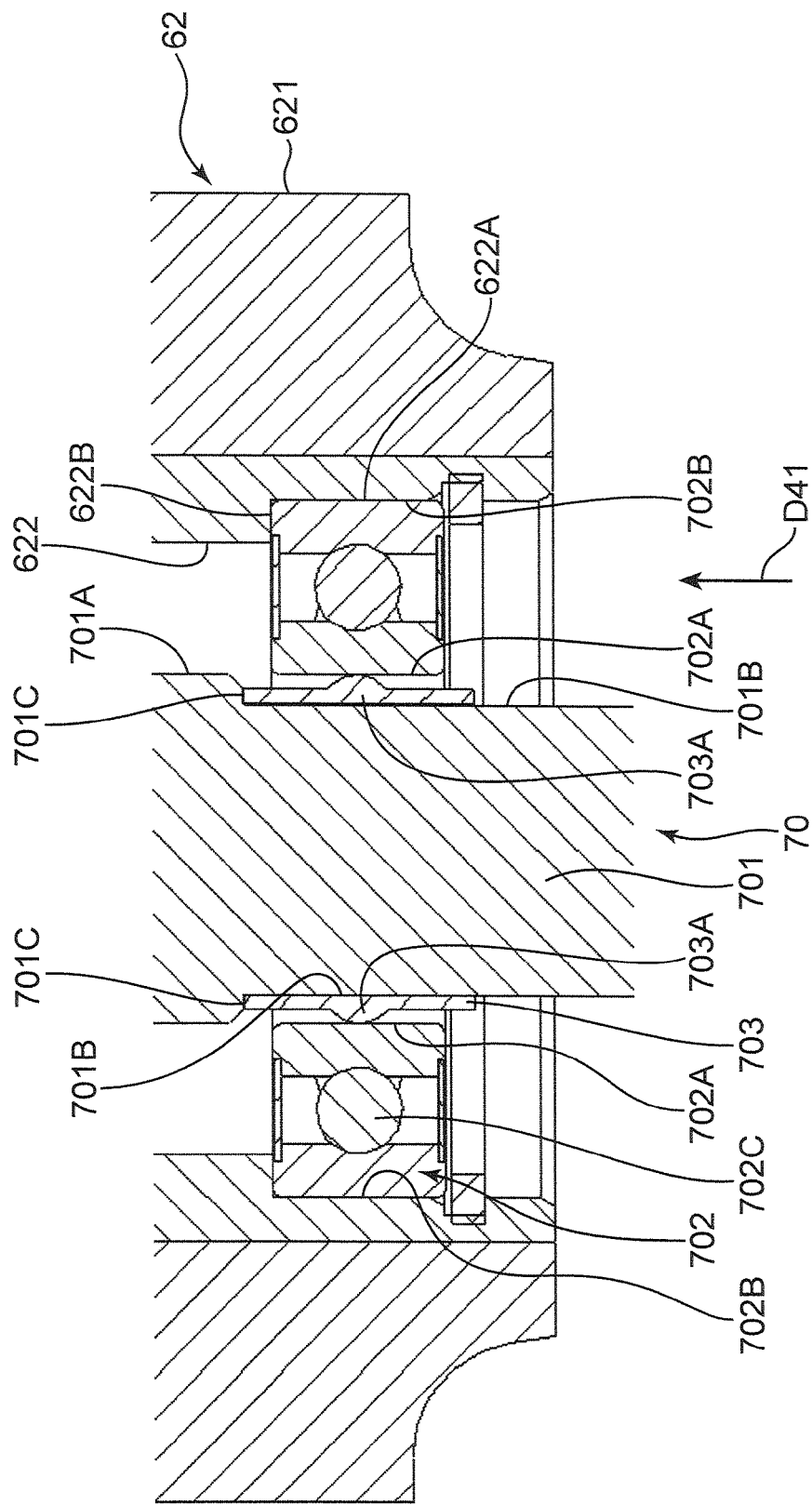
FIG. 4 is an enlarged cross section of the rotating body support device according to an embodiment of the present disclosure.

The support structure of the fixing roller 62 according to this embodiment is now explained with reference to FIG. 3 and FIG. 4. FIG. 3 is a cross section explaining the load that is applied to the fixing roller 62 according to this embodiment. Moreover, FIG. 4 is an enlarged cross section of the roller support device 70 for supporting the fixing roller 62 according to this embodiment.

Referring to FIG. 3, the fixing roller 62 is formed in a cylindrical shape that is extended in the sheet width direction to which the fixation treatment is performed. The fixing roller 62 is rotatably supported by the roller support device 70. The fixing roller 62 includes a roller outer peripheral part 621, and a roller inner peripheral part 622 (mounting member). The roller outer peripheral part 621 is an outer peripheral part of the fixing roller 62 and is configured from an elastic member such as silicon rubber. The roller inner peripheral part 622 is a cylindrical inner peripheral part of the fixing roller 62, and is configured from a metal element tube for supporting the elastic member. Referring to FIG. 4, a large diameter part 622A (insertion part) is disposed at both ends of the roller inner peripheral part 622 in the axial direction. The large diameter part 622A is a portion in which the inner diameter of the roller inner peripheral part 622 has been enlarged. A roller stepped part 622B is disposed on the inner side of the large diameter part 622A in the axial direction. A bearing 702 described later is mounted on the large diameter part 622A. To put it differently, the roller inner peripheral part 622 of the fixing roller 62 functions as a mounting member to which the bearing 702 described later is fixed.

The roller support device 70 (rotating body support device) rotatably supports the fixing roller 62. The roller support device 70 includes a shaft 701 (rotating shaft), and a bearing 702.

The shaft 701 is a fixed shaft during the rotation of the fixing roller 62. The shaft 701 is run so as to penetrate the fixing roller 62. The shaft 701 includes a shaft outer peripheral face 701A, a shaft small diameter part 701B (FIG. 4) (first small diameter part), a shaft end 701Z (FIG. 3), and a sleeve 703 (FIG. 4) (circular tube member). The shaft outer peripheral face 701A is the outer peripheral part of the shaft 701 that is disposed inside the fixing roller 62. The shaft small diameter part 701B is connected to both ends of the shaft outer peripheral face 701A in the axial direction. The outer diameter of the shaft small diameter part 701B is set to be slightly smaller than that of the shaft outer peripheral face 701A. A shaft stepped part 701C is disposed between the shaft outer peripheral face 701A and the shaft small diameter part 701B. In addition, the shaft end 701Z is a portion that is disposed at both ends of the shaft 701 in the axial direction and in which the shaft diameter is further reduced than the shaft small diameter part 701B. The shaft end 701Z is fixed to a housing (not shown) of the fixing unit 60.

The sleeve 703 is fitted onto the shaft small diameter part 701B of the shaft 701. In the axial direction of the shaft 701, the sleeve 703 is disposed so as to come up against the shaft stepped part 701C. The sleeve 703 is a circular tube member that is slightly wider than the bearing 702 described later in the axial direction of the shaft 701. The sleeve 703 includes a protruding part 703A. The protruding part 703A is provided in a protruding manner from the outer peripheral portion at the center of the sleeve 703 in the axial direction toward the radial direction of the shaft 701. The protruding part 703A runs along the peripheral direction of the sleeve 703. Note that, in the cross sectional view shown in FIG. 4, the protruding part 703A is provided in a protruding manner in an arc shape toward the radial direction. In addition, as a result of the sleeve 703 being fitted onto the shaft small diameter part 701B formed on the shaft 701, the positioning of the sleeve 703 in the axial direction of the shaft 701 is realized. Particularly, the foregoing positioning is realized by the end on the inner side of the sleeve 703 in the axial direction coming into contact with the shaft stepped part 701C.

The bearing 702 is disposed in a pair at both ends of the fixing roller 62 in the axial direction. In this embodiment, the bearing 702 is configured from a ball bearing. The bearing 702 includes an inner peripheral part 702A, an outer peripheral part 702B, and a ball 702C. The inner peripheral part 702A configures the inner peripheral part of the bearing 702, and is placed opposite the shaft 701. The protruding part 703A of the sleeve 703 comes into contact with the inner peripheral part 702A. The outer peripheral part 702B configures the outer peripheral part of the bearing 702, and is disposed at an interval in the radial direction relative to the inner peripheral part 702A. A ball 702C is disposed between the inner peripheral part 702A and the outer peripheral part 702B. The ball 702C is a spherical body disposed in a plurality in the peripheral direction of the bearing 702. As a result of the plurality of balls 702C rolling in a groove not shown formed in the inner peripheral part 702A and the outer peripheral part 702B, the relative rotation of the inner peripheral part 702A and the outer peripheral part 702B is enabled.

After the foregoing sleeve 703 is fitted onto the shaft small diameter part 701B of the shaft 701, the bearing 702 is mounted between the sleeve 703 and the roller inner peripheral part 622. Here, the outer peripheral part 702B of the bearing 702 is mounted on the large diameter part 622A of the roller inner peripheral part 622. Note that the outer peripheral part 702B is mounted so as to come up against the roller stepped part 622B in the axial direction. Moreover, the inner peripheral part 702A is disposed outside the sleeve 703 in the radial direction while coming into slidable contact with the protruding part 703A. Consequently, the shaft 701, the sleeve 703, and the inner peripheral part 702A of the bearing 702 become integrated. Meanwhile, the fixing roller 62 including the roller inner peripheral part 622, and the outer peripheral part 702B of the bearing 702 become integrated, and rotatable relative to the shaft 701. Here, the protruding part 703A of the sleeve 703 and the inner peripheral part 702A of the bearing 702 are in line contact (linearly in contact) along the peripheral direction. Note that the term "line contact" as used in this embodiment refers to a linearly contact in comparison to the case of the inner peripheral part 702A coming into contact with the sleeve 703 (shaft 701) across the entire width in the axial direction, and includes a mode where the tip part of the arc-shaped protruding part 703A comes into contact with the inner peripheral part 702A in a slight width thereof. Moreover, the protruding part in linear contact is not limited to a single protruding part that is disposed in succession in the peripheral direction, and may also be a plurality of protruding parts disposed at an interval in the peripheral direction as in a modified embodiment described later. In addition, the protruding part is not limited to those in a line contact or linearly in contact. In other words, the protruding part may also come into contact along the peripheral direction. Moreover, while FIG. 4 shows one end side of the fixing roller 62 in the axial direction, as shown in FIG. 3, the same configuration is also provided to the other end side of the fixing roller 62 in the axial direction.

Figure 5:
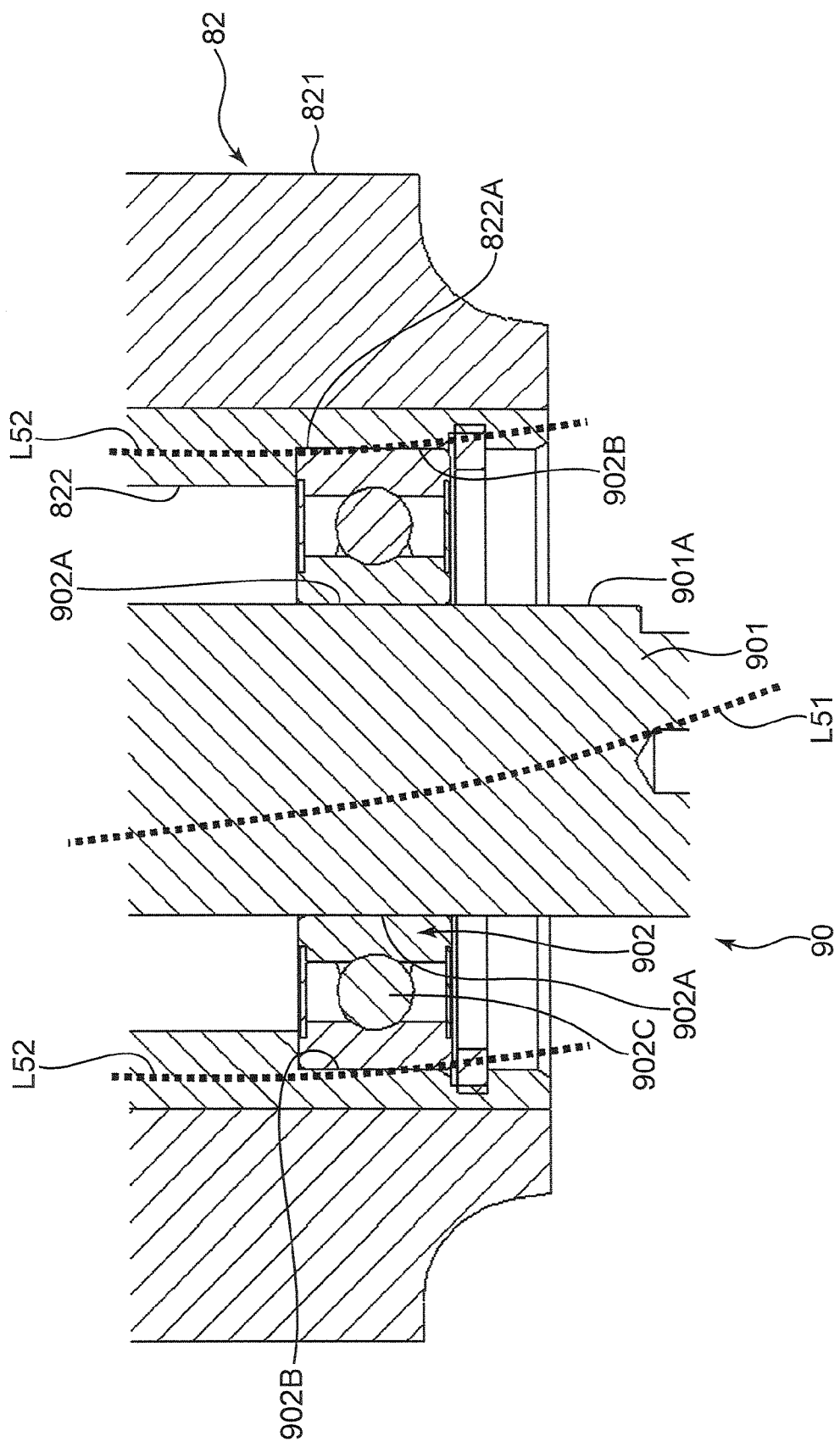
FIG. 5 is an enlarged cross section of another rotating body support device to be compared with the rotating body support device according to an embodiment of the present disclosure.
Figure 6A:
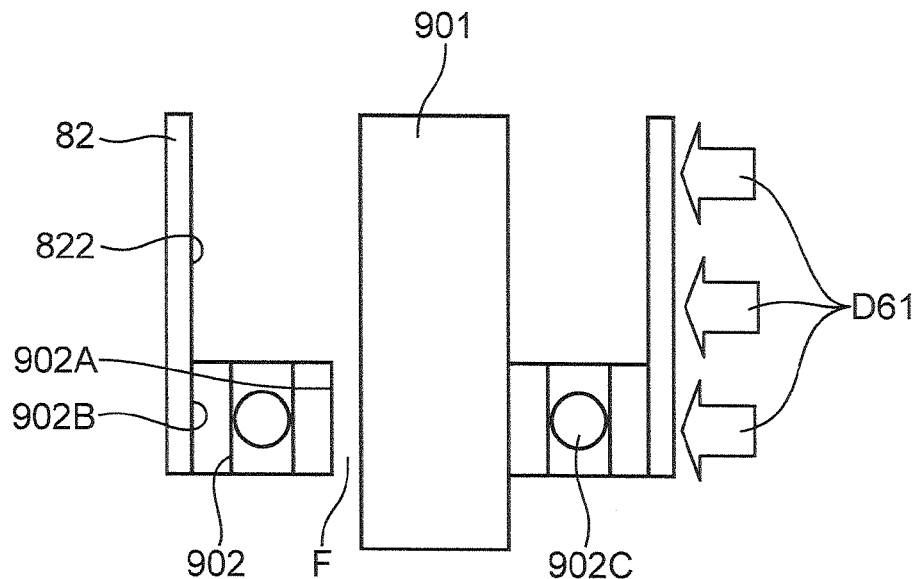
FIG. 6A is a schematic cross section explaining a state before the load is applied in the other rotating body support device to be compared with the rotating body support device according to an embodiment of the present disclosure.
Figure 6B:
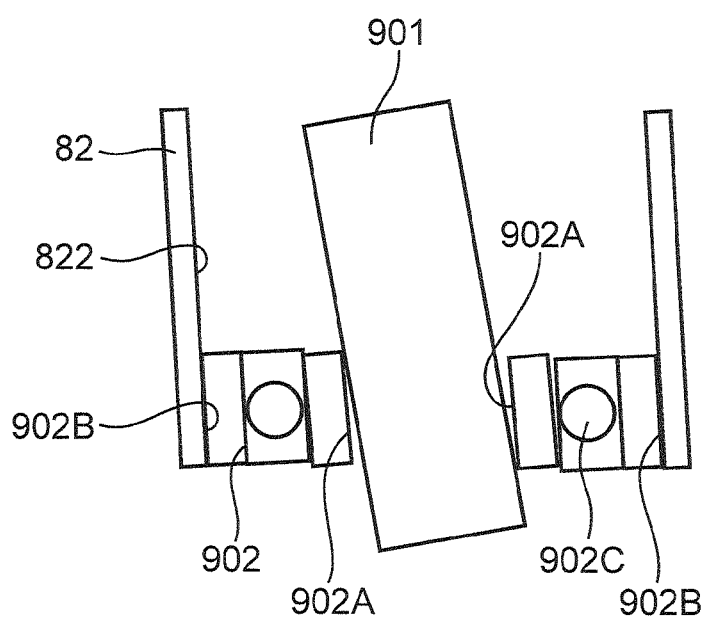
FIG. 6B is a schematic cross section explaining a state where the load is applied in the other rotating body support device to be compared with the rotating body support device according to an embodiment of the present disclosure.

Problems that arise when the roller support device 70 according to this embodiment is not provided are now explained with reference to FIG. 5 and FIG. 6. FIG. 5 is an enlarged cross section of a roller support device 90 to be compared with the roller support device 70 according to this embodiment. FIG. 6A and FIG. 6B are schematic cross sections explaining the behavior when the load is applied to the roller support device 90.

Since the roller support device 90 differs from the roller support device 70 with respect to the point of not including the shaft small diameter part 701B and the sleeve 703, the foregoing difference is explained, and the explanation of the remaining points is omitted.

The roller support device 90 rotatably supports the fixing roller 82 relative to the shaft 901. Both ends of the shaft 901 are fixed to a housing not shown. In addition, the shaft 901 is supported by the bearing 902 at both ends of the fixing roller 82. Here, the bearing 902 is directly fitted onto the shaft outer peripheral face 901A which corresponds to the outer peripheral part of the shaft 901. Specifically, the inner peripheral part 902A of the bearing 902 comes into contact with the shaft outer peripheral face 901A at a predetermined width in the axial direction. Moreover, the outer peripheral part 902B of the bearing 902 is mounted on the large diameter part 822A formed on the roller inner peripheral face 822 of the fixing roller 82. Consequently, the shaft 901 and the inner peripheral part 902A of the bearing 902 become integrated. Meanwhile, the fixing roller 82 and the outer peripheral part 902B of the bearing 902 become integrated, and rotatable relative to the shaft 901.

As with the fixing roller 62 shown in FIG. 3, when the pressure roller not shown is pressed against the fixing roller 82 of FIG. 5, the fixing roller 82 is subject to a pressing force load (refer to arrow D31 of FIG. 3). Meanwhile, as with the shaft 701 of FIG. 3, since both ends of the shaft 901 are fixed to a housing not shown, as the reaction force of the foregoing pressing force load, load is applied to both ends of the shaft 901 in a direction that is opposite to the pressing force load applied to the fixing roller 82 (refer to arrow D32 of FIG. 3). Within the image forming apparatus 1, a particularly large load is applied to the fixing roller 62 (fixing roller 82) and the pressure roller 63 (pressure roller not shown that is pressed by the fixing roller 82) in the fixing unit 60. As an example, the pressing force load of the pressure roller 63 shown with the arrow D31 in FIG. 3 is 600 N, and the loads (arrow D32 of FIG. 32) applied to both ends of the shaft 701 as the reaction force are respectively 300 N.

When the foregoing loads are applied to the fixing roller 82, the shaft 901, and the bearing 902 of FIG. 5 (refer to D61 of FIG. 6A), the bending of the fixing roller 82 in the axial direction (L52 of FIG. 5) and the bending of the shaft 901 in the axial direction (L51 of FIG. 5) will be distributed at different angles. More specifically, as shown in FIG. 6A, a predetermined fitting gap F is formed between the shaft 901 and the inner peripheral part 902A of the bearing 902. Consequently, as shown in FIG. 6B, the shaft 901 will be tilted at a greater angle than the fixing roller 82. Here, the outer peripheral part 902B of the bearing 902 is tilted so as to follow the roller inner peripheral face 822 of the fixing roller 82. Meanwhile, the inner peripheral part 902A of the bearing 902 is tilted at an angle that is greater than that of the outer peripheral part 902B so as to follow the shaft 901. Thus, as a result of the tilt angle being difference between the inner peripheral part 902A and the outer peripheral part 902B of the bearing, there are cases where the bearing 902 may collapse. Otherwise, the ball 902C may become separated from the bearing 902, and the rotating function of the bearing 902 may become lost.

Meanwhile, with the roller support device 70 according to this embodiment, as shown in FIG. 4, the contact between the shaft 701 and the bearing 702 is realized between the protruding part 703A of the sleeve 703 and the inner peripheral part 702A of the bearing 702. In addition, the protruding part 703A of the sleeve 703 and the inner peripheral part 702A of the bearing 702 for a line contact along the peripheral direction. Thus, when the loads shown with the arrows D31 and D32 of FIG. 3 are applied to the fixing roller 62 and the shaft 701, the outer peripheral part 702B of the bearing 702 is tilted to follow the roller inner peripheral part 622 (large diameter part 622A) of the fixing roller 62.

Meanwhile, while the shaft 701 is tilted at an angle that is greater than that of the fixing roller 62, the inner peripheral part 702A of the bearing 702 can move flexibly while sliding across the surface of the arc-shaped protruding part 703A. In other words, the title angle between the inner peripheral part 702A and the shaft 701 is different. Consequently, the inner peripheral part 702A of the bearing 702 will not be corrected excessively by the shaft 701, and the inner peripheral part 702A can be tilted so as to follow the outer peripheral part 702B. Accordingly, in comparison to the case shown in FIG. 6B, it is possible to inhibit the tilt angle from becoming great between the inner peripheral part 702A and the outer peripheral part 702B of the bearing 702. It is thereby possible to favorably inhibit the collapse of the bearing 702 or the separation of the ball 702C. Moreover, according to this embodiment, the protruding part 703A can be disposed on the side of the shaft 701 as a result of the protruding part 703A being provided in a protruding manner from the sleeve 703.

Furthermore, in this embodiment, the pair of bearings 702 is supported by the roller inner peripheral part 622 of the fixing roller 62. When the roller inner peripheral part 622 of the fixing roller 62 is tilted in a direction which intersects with the axial direction of the shaft 701, an external force is generated toward different directions in the respective bearings 702. Even in the foregoing case, the inner peripheral part 702A of the respective bearings 702 will not be excessively corrected by the shaft 701, and it will be possible to follow the tilt of the outer peripheral part 702B. Accordingly, damage to the bearing 702 can be favorably inhibited in a plurality of bearings 702.

Moreover, according to this embodiment, even when a large load is generated in the fixing roller 62 as a result of the pressure roller 63 being pressed against the fixing roller 62, the rotation of the fixing roller 62 can be stably maintained by the roller support device 70. Moreover, based on the pressing force, even when the fixing roller 62 is tilted in a direction which intersects with the axial direction of shaft 701, damage to the bearing 702 can be favorably inhibited. Consequently, the fixation treatment of the toner image (developer image) onto the sheet can be stably realized in the fixing unit 60.

The roller support device 70, and the fixing unit 60 and the image forming apparatus 1 including the roller support device according to an embodiment of the present disclosure were explained above, but the present disclosure is not limited thereto, and may also adopt, for instance, the following modified embodiments.

(1) In the foregoing embodiment, explained was a mode where, as a result of the pressure roller 63 being pressed against the fixing roller 62, the shaft 701 is tilted at a greater angle than the fixing roller 62, but the present disclosure is not limited thereto. Depending on the relation of rigidity between the fixing roller 62 and the shaft 701, there are cases where the fixing roller 62 is tilted at a greater angle than the shaft 701. Even in the foregoing case, since the inner peripheral part 702A of the bearing 702 can slidably move relative to the protruding part 703A of the sleeve 703, the difference in the tilt between the inner peripheral part 702A and the outer peripheral part 702B can be favorably reduced.

(2) Moreover, in the foregoing embodiment, explained was a mode where the roller support device 70 is disposed on the fixing roller 62, but the present disclosure is not limited thereto. The roller support device 70 may also rotatably support the pressure roller 63 that is pressed against the fixing roller 62.

(3) In addition, in the foregoing embodiment, explained was a mode where the shaft 701 is a fixed shaft and the fixing roller 82 is rotatable relative to the shaft 701, but the present disclosure is not limited thereto. In other words the shaft 701 may also be a rotating shaft which rotates integrally with the fixing roller 82, and the roller support device 70 may be disposed in a housing (not shown) of the fixing unit 60 and rotatably support the shaft 701. In the foregoing case, the housing supports the bearing 702 as the mounting member.

Figure 7:
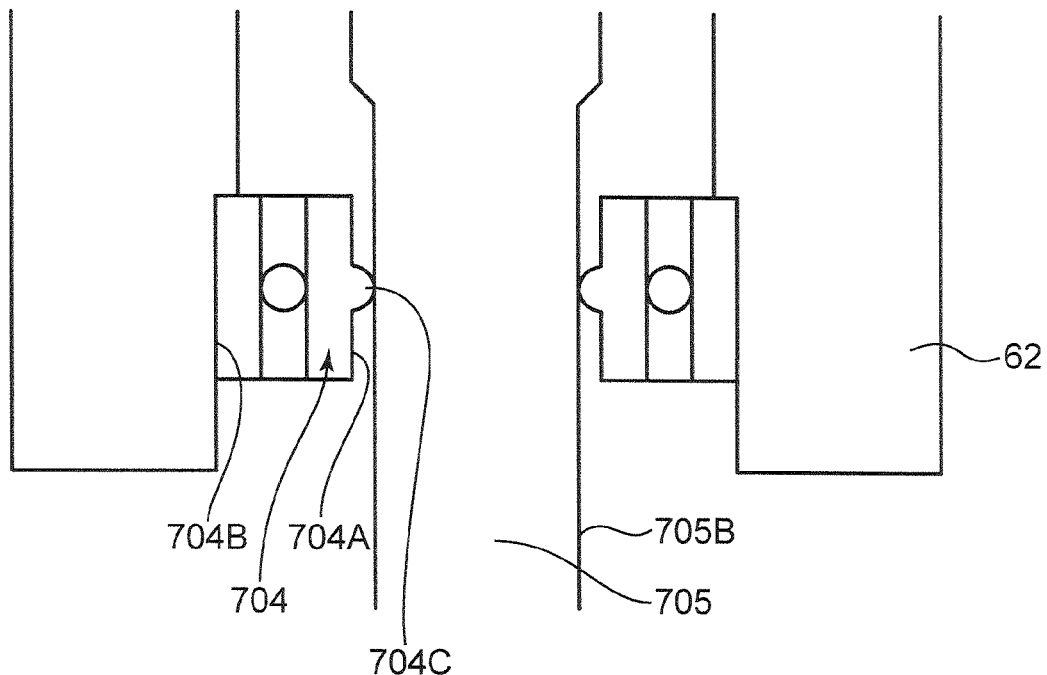
FIG. 7 is a schematic cross section showing the protruding part according to a modified embodiment of the present disclosure.
Figure 9D:
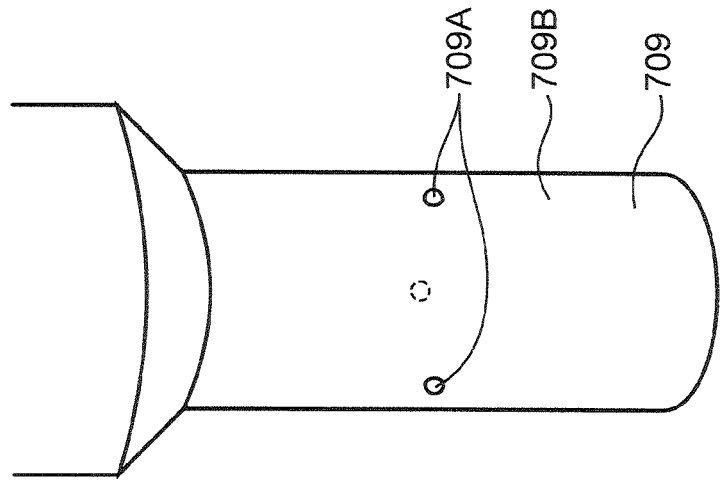
FIG. 9A, FIG. 9B, FIG. 9C and FIG. 9D are perspective views showing the arrangement of the protruding part according to a modified embodiment of the present disclosure.
Figure 9C:
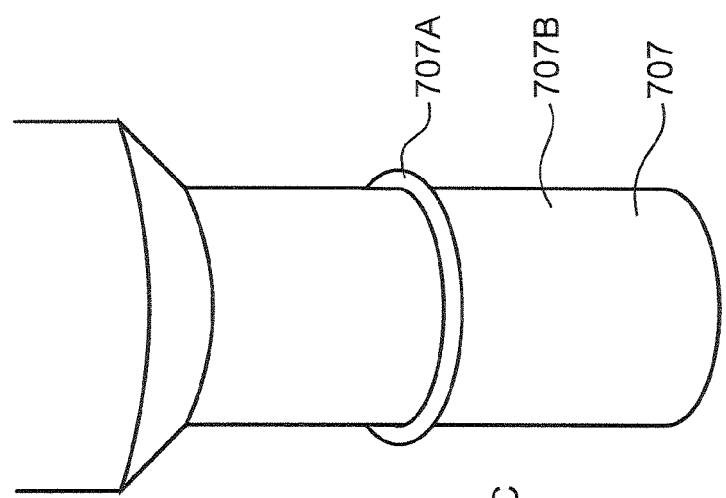
Figure 9A:
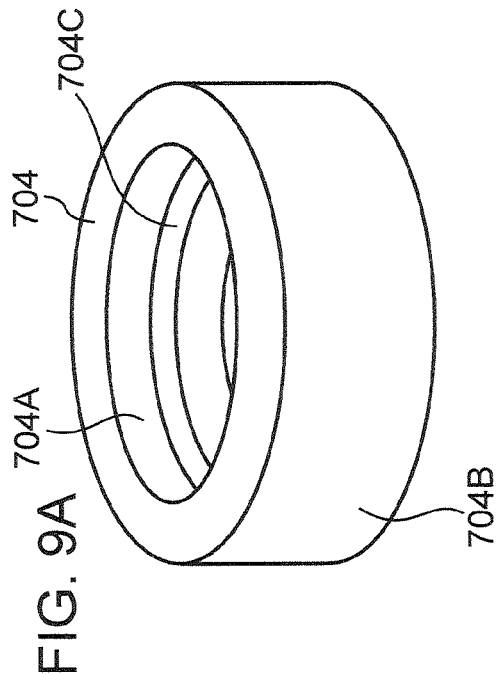

(4) Moreover, in the foregoing embodiment, explained was a mode where the sleeve 703 is fitted onto the shaft 701 and the protruding part 703A is provided in a protruding manner from the sleeve 703 in a radial direction, but the present disclosure is not limited thereto. FIG. 7 is a schematic cross section showing the protruding part according to this modified embodiment. The shaft 705 does not include a sleeve as in the preceding embodiment, and includes a shaft tip part 705B (second small diameter part) having a small diameter placed opposite to the bearing 704. A protruding part 704C is provided in a protruding manner from the inner peripheral part 704A of the bearing 704 toward the inner side in the radial direction so as to face the shaft tip part 705B. A perspective view of the bearing 704 is shown in FIG. 9A. The protruding part 704C is provided in a protruding manner from the entire peripheral part of the inner peripheral part 704A of the bearing 704 toward the inner side. In the foregoing case, the protruding part 704C may be formed integrally with the bearing 704, or may be configured from a separate member like the sleeve 703 of the preceding embodiment. In addition, the shape of the tip part of the protruding part is not limited to an arc shape, and the tip part of the protruding part 703A may be of a triangular shape or includes a slightly flat surface in the cross sectional view shown in FIG. 4.

Figure 8:
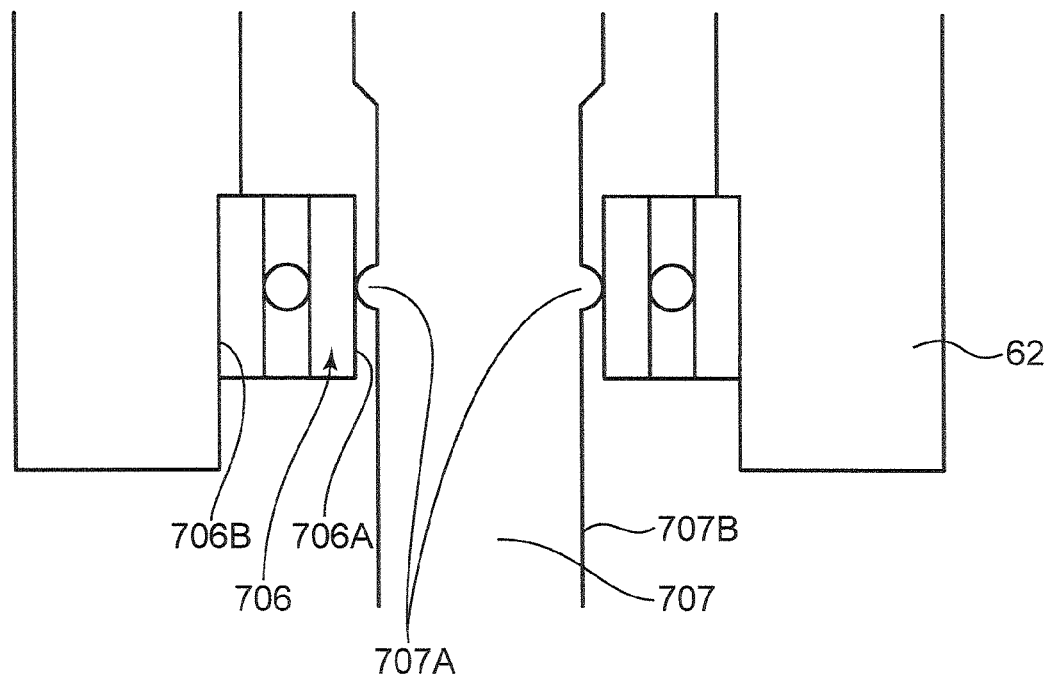
FIG. 8 is a schematic cross section showing the protruding part according to another modified embodiment of the present disclosure.

(5) In addition, FIG. 8 is a schematic cross section showing the protruding part according to another modified embodiment. This modified embodiment differs from the preceding embodiment with respect to the point that the sleeve 703 (FIG. 4) is not provided, and the protruding part 707A is provided in a protruding manner from the shaft 707. Moreover, a perspective view of the shaft 707 is shown in FIG. 9C. The protruding part 707A is provided in a protruding manner from the entire peripheral part of the shaft small diameter part 707B of the shaft 707 toward the outer side.

Figure 9B:
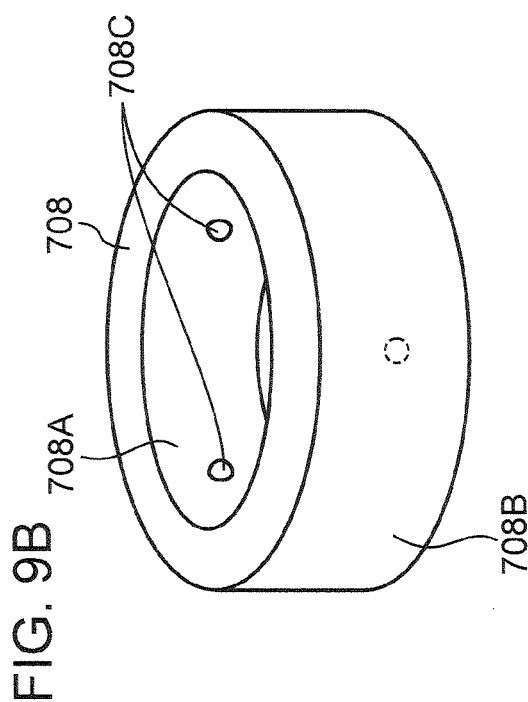

(6) In addition, the respective protruding parts that are provided in a protruding manner from the bearing 704 or the sleeve 707 are not limited to those which are provided in a protruding manner from the entire peripheral part in the peripheral direction. FIG. 9B is a perspective view of the bearing 708 including the protruding part 708C disposed at three locations in the peripheral direction unlike the protruding part 704C of the bearing 704 shown in FIG. 9A. Moreover, FIG. 9D is a perspective view of the shaft 709 including the protruding part 709A disposed at three locations in the peripheral direction unlike the protruding part 707A of the shaft 707 shown in FIG. 9C. In other words, with regard to the configuration of this kind of modified embodiment, the protruding part is provided, in a plurality, in a protruding manner at an interval in the peripheral direction from the shaft small diameter part 709B of the shaft 709 or the inner peripheral part 708A of the bearing 708. Furthermore, a plurality of contact parts formed as a result of the plurality of protruding parts coming into contact with the opposing shaft or bearing are disposed linearly along the peripheral direction. Accordingly, as a result of including a plurality of protruding parts in the peripheral direction and the contact parts of the protruding parts being disposed linearly in the peripheral direction, the same operation and effect as each of the foregoing embodiments can be yielded. Moreover, the contact load of the respective shafts and the bearing is reduced. Note that, in order to stably maintain the rotation between the respective shafts and the bearing, the plurality of protruding parts are desirably disposed at three or more locations.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

The invention claimed is:

1. A rotating body support device, comprising:
a shaft to serve as a rotating shaft that rotates or a fixed shaft during rotation of a rotating body;
a bearing including an inner peripheral part for supporting the shaft and an outer peripheral part disposed at an interval in a radial direction relative to the inner peripheral part;
a mounting member including an insertion part, on which the outer peripheral part of the bearing is mounted so that the mounting member supports the bearing; and
a protruding part protruding in the radial direction from one of a peripheral face of the shaft and the inner peripheral part of the bearing and extending in a peripheral direction of the rotation so that the protruding part is in line-contact with the other one of the peripheral face of the shaft and the inner peripheral part of the bearing in the peripheral direction of the rotation.

2. The rotating body support device according to claim 1, wherein
the shaft includes a part that faces the bearing and has a diameter that is reduced to define a reduced diameter part, and
the protruding part protrudes from the inner peripheral part of the bearing, the protruding part facing and contacting the reduced diameter part of the shaft.

3. The rotating body support device according to claim 1, wherein
the inner peripheral part of the bearing is rotated integrally with the shaft relative to the outer peripheral part, and the outer peripheral part of the bearing is fixed to the insertion part of the mounting member.

4. The rotating body support device according to claim 3, wherein
the bearing is a ball bearing including a plurality of spherical bodies which are disposed between the inner peripheral part and the outer peripheral part along the peripheral direction.

5. The rotating body support device according to claim 1, wherein
the bearing is disposed in a pair on one end side and another end side of the shaft in an axial direction, and
the mounting member includes a pair of insertion parts and supports the pair of bearings.

6. A fixing device, comprising:
a fixing roller placed opposite to a developer image carried on a sheet;
a pressure roller pressed against the fixing roller and forming with the fixing roller a fixation nip part so that a sheet passes between the pressure roller the fixing roller; and
the rotating body support device according to claim 1, the rotating body support device rotatably supporting the fixing roller or the pressure roller.

7. An image forming apparatus, comprising:
an image forming part for forming a developer image on a sheet; and
a fixing device for performing fixation treatment of the developer image to the sheet, wherein
the fixing device includes:
a fixing roller placed opposite to a developer image carried on a sheet;
a pressure roller pressed against the fixing roller and forming with the fixing roller a fixation nip part so that a sheet passes between the pressure roller and the fixing roller; and
the rotating body support device according to claim 1, the rotating body support device rotatably supporting the fixing roller or the pressure roller.

8. A rotating body support device, comprising:
a shaft to serve as a rotating shaft that rotates or a fixed shaft during rotation of a rotating body;
a bearing including an inner peripheral part for supporting the shaft and an outer peripheral part disposed at an interval in a radial direction relative to the inner peripheral part;
a mounting member including an insertion part, on which the outer peripheral part of the bearing is mounted so that the mounting member supports the bearing; and
a plurality protruding parts protruding in the radial direction from one of a peripheral face of the shaft and the inner peripheral part of the bearing and spaced apart in a peripheral direction of the rotation so that the protruding parts contact the other one of the peripheral face of the shaft and the inner peripheral part of the bearing to form a plurality of contact parts where the plurality of protruding parts contact the other one of the peripheral face of the shaft and the inner peripheral part of the bearing with the contact parts being disposed linearly along the peripheral direction of the rotation.

9. A fixing device, comprising:
a fixing roller placed opposite to a developer image carried on a sheet;
a pressure roller pressed against the fixing roller and forming with the fixing roller a fixation nip part so that a sheet passes between the pressure roller the fixing roller; and
the rotating body support device according to claim 8, the rotating body support device rotatably supporting the fixing roller or the pressure roller.

10. An image forming apparatus, comprising:
an image forming part for forming a developer image on a sheet; and
a fixing device for performing fixation treatment of the developer image to the sheet, wherein
the fixing device includes:
a fixing roller placed opposite to a developer image carried on a sheet;
a pressure roller pressed against the fixing roller and forming with the fixing roller a fixation nip part so that a sheet passes between the pressure roller and the fixing roller; and
the rotating body support device according to claim 8, the rotating body support device rotatably supporting the fixing roller or the pressure roller.

11. A rotating body support device, comprising:
a shaft to serve as a rotating shaft that rotates or a fixed shaft during rotation of a rotating body;
a bearing including an inner peripheral part for supporting the shaft and an outer peripheral part disposed at an interval in a radial direction relative to the inner peripheral part; and
a mounting member including an insertion part, on which the outer peripheral part of the bearing is mounted so that the mounting member supports the bearing, wherein
the shaft includes:
a first small diameter part that faces the bearing and partially the shaft diameter of which is reduced; and
a circular tube member externally fitted onto the first small diameter part; and
a protruding part protruding in a radial direction from an outer peripheral face of the circular tube member and extending in a peripheral direction of the rotation so that the protruding part comes into contact with the inner peripheral face of the bearing.

12. A fixing device, comprising:
a fixing roller placed opposite to a developer image carried on a sheet;
a pressure roller pressed against the fixing roller and forming with the fixing roller a fixation nip part so that a sheet passes between the pressure roller the fixing roller; and
the rotating body support device according to claim 11, the rotating body support device rotatably supporting the fixing roller or the pressure roller.

13. An image forming apparatus, comprising:
an image forming part for forming a developer image on a sheet; and
a fixing device for performing fixation treatment of the developer image to the sheet, wherein
the fixing device includes:
a fixing roller placed opposite to a developer image carried on a sheet;
a pressure roller pressed against the fixing roller and forming with the fixing roller a fixation nip part so that a sheet passes between the pressure roller and the fixing roller; and
the rotating body support device according to claim 11, the rotating body support device rotatably supporting the fixing roller or the pressure roller.

* * * * *